(12) United States Patent
Hwang et al.

(10) Patent No.: US 11,128,668 B2
(45) Date of Patent: Sep. 21, 2021

(54) HYBRID NETWORK INFRASTRUCTURE MANAGEMENT

(71) Applicant: International Business Machines Corporation, Armonk, NY (US)

(72) Inventors: Jinho Hwang, Ossining, NY (US); Nikolaos Anerousis, Los Gatos, CA (US); Brian Peterson, Ridgefield, CT (US); Milton H. Hernandez, Tenafly, NJ (US)

(73) Assignee: International Business Machines Corporation, Armonk, NY (US)

( * ) Notice: Subject to any disclaimer, the term of this patent is extended or adjusted under 35 U.S.C. 154(b) by 196 days.

(21) Appl. No.: 16/208,727

(22) Filed: Dec. 4, 2018

(65) Prior Publication Data

US 2020/0177634 A1 Jun. 4, 2020

(51) Int. Cl.
*H04L 29/06* (2006.01)
*G06N 20/00* (2019.01)

(52) U.S. Cl.
CPC ............. *H04L 63/20* (2013.01); *G06N 20/00* (2019.01); *H04L 63/1433* (2013.01)

(58) Field of Classification Search
CPC ..... H04L 63/20; H04L 63/1433; H04L 29/06; G06N 20/00; G06N 20/10; G06N 5/045; G06N 5/025
See application file for complete search history.

(56) References Cited

U.S. PATENT DOCUMENTS

| 6,301,613 | B1 | 10/2001 | Ahlstrom et al. | |
|---|---|---|---|---|
| 7,000,006 | B1 | 2/2006 | Chen | |
| 9,886,267 | B2 | 2/2018 | Maheshwari et al. | |
| 9,887,876 | B2 | 2/2018 | Kumar et al. | |
| 2009/0300748 | A1* | 12/2009 | Diehl | H04L 63/0263 726/11 |
| 2013/0268994 | A1* | 10/2013 | Cooper | G06F 21/566 726/1 |
| 2016/0105461 | A1* | 4/2016 | Kakutani | H04L 67/306 726/1 |

(Continued)

OTHER PUBLICATIONS

Turner, Yoshio, et al., "Securing Microservice Interactions in Openstack and Kubernetes", 2017.

(Continued)

*Primary Examiner* — Quazi Farooqui
(74) *Attorney, Agent, or Firm* — Lieberman & Brandsdorfer, LLC

(57) ABSTRACT

Embodiments relate to an intelligent computer platform to utilize a micro-service architecture that supports secure connection and policy management for devices. The micro-services include managers to support establishment of a secure connection. The managers register devices in the architecture, and define security policies which are encoded as rules. The policies and corresponding rules are stored in a knowledge base operatively coupled to the architecture. The patterns of security policies are learned over time and used for recommending new rules or validating existing rules. The managers selectively validate one or more rules that correspond to a setting of a requesting device. The secure connection is established for a network level device determined to comply with one or more of the selectively validated rules.

20 Claims, 8 Drawing Sheets

(56) References Cited

U.S. PATENT DOCUMENTS

2017/0041406 A1    2/2017  Lawson et al.
2018/0331905 A1*  11/2018  Toledo ................ H04L 43/0882
2019/0020669 A1*   1/2019  Glatfelter ............ H04L 63/1425
2020/0028935 A1*   1/2020  Sahay ................... G06F 9/5088

OTHER PUBLICATIONS

Sun, Yuqiong, et al., "Security-as-a-Service for Microservices-Based Cloud Applications", CLOUDCOM '15 Proceedings of the 2015 IEEE 7th International Conference on Cloud Computing Technology and Science (CloudCom) pp. 50-57.
Siemens et al., "Policy Based Overload Control in Communication Networks", Sep. 25, 2006.
Anonymous, "Micro-Segmentation Security for Micro-Services Using an Interaction Graph", Nov. 2, 2016.
Anonymous, "Mesh Performance Optimization in Optical Networks for Co-Routed Services", Jan. 3, 2018.

* cited by examiner

HYBRID NETWORK INFRASTRUCTURE MANAGEMENT

BACKGROUND

The present embodiments relate to an artificial intelligence platform in a hybrid network infrastructure. More specifically, the embodiments relate to employing machine learning with respect to deploying and enforcing security protocols in the hybrid network infrastructure.

Artificial Intelligence (AI) relates to the field of computer science directed at computers and computer behavior as related to humans. AI refers to the intelligence when machines, based on information, are able to make decisions, which maximizes the chance of success in a given topic. More specifically, AI is able to learn from a data set to solve problems and provide relevant recommendations. For example, in the field of artificially intelligent computer systems, natural language systems (such as the IBM Watson® artificially intelligent computer system or other natural language interrogatory answering systems) process natural language based on system acquired knowledge. To process natural language, the system may be trained with data derived from a database or corpus of knowledge, but the resulting outcome can be incorrect or inaccurate for a variety of reasons.

Machine learning (ML), which is a subset of Artificial intelligence (AI), utilizes algorithms to learn from data and create foresights based on this data. More specifically, ML is the application of AI through creation of neural networks that can demonstrate learning behavior by performing tasks that are not explicitly programmed. Deep learning is a type of ML in which systems can accomplish complex tasks by using multiple layers of choices based on output of a previous layer, creating increasingly smarter and more abstract conclusions.

At the core of AI and associated reasoning lies the concept of similarity. The process of understanding natural language and objects requires reasoning from a relational perspective that can be challenging. Structures, including static structures and dynamic structures, dictate a determined output or action for a given determinate input. More specifically, the determined output or action is based on an express or inherent relationship within the structure. This arrangement may be satisfactory for select circumstances and conditions. However, it is understood that dynamic structures are inherently subject to change, and the output or action may be subject to change accordingly.

SUMMARY

The embodiments include a system, computer program product, and method for hybrid network infrastructure management.

In one aspect, a system is provided for use with an intelligent computer platform to deploy a micro-service architecture as a stateless application to manage a hybrid network infrastructure. The micro-service supports secure connection and policy management for devices at a network level. The micro-services include tools in the form of managers to support establishment of a secure connection. The tools include, but are not limited to, a policy manager and a rule manager. The policy manager registers devices in the architecture, and defines security policies which are encoded as rules. The policies and corresponding rules are stored in a knowledge base operatively coupled to the architecture. The rule manager selectively validates one or more rules that correspond to a setting of a requesting device. The secure connection is established for a network level device determined to comply with one or more selectively validated rules.

In another aspect, a computer program device is provided to deploy a micro-service architecture as a stateless application to manage a hybrid network infrastructure. The micro-service supports secure connection and policy management for devices at a network level. The computer program product includes a computer readable storage medium with embodied program code. The program code registers devices in the architecture, and defines security policies which are encoded as rules. Corresponding rules are stored in a knowledge base operatively coupled to the architecture. The program code selectively validates one or more rules that correspond to a setting of a requesting device. A secure connection is established for a network level device determined to comply with one or more selectively validated rules.

In yet another aspect, a method is provided for deploying a micro-service architecture as a stateless application to manage a hybrid network infrastructure. The micro-service supports secure connection and policy management for devices at a network level. Devices are registered in the micro-service architecture. One or more security policies are defined and encoded as rules, and storage in an operatively coupled knowledge base. In response to a network configuration request, one or more rules that correspond to a setting of a requesting device are selectively validated. A secure connection is established for a network level device determined to comply with the selectively validated one or more rules.

These and other features and advantages will become apparent from the following detailed description of the presently preferred embodiment(s), taken in conjunction with the accompanying drawings.

BRIEF DESCRIPTION OF THE SEVERAL VIEWS OF THE DRAWINGS

The drawings reference herein forms a part of the specification. Features shown in the drawings are meant as illustrative of only some embodiments, and not of all embodiments, unless otherwise explicitly indicated.

DETAILED DESCRIPTION

Figure 1:
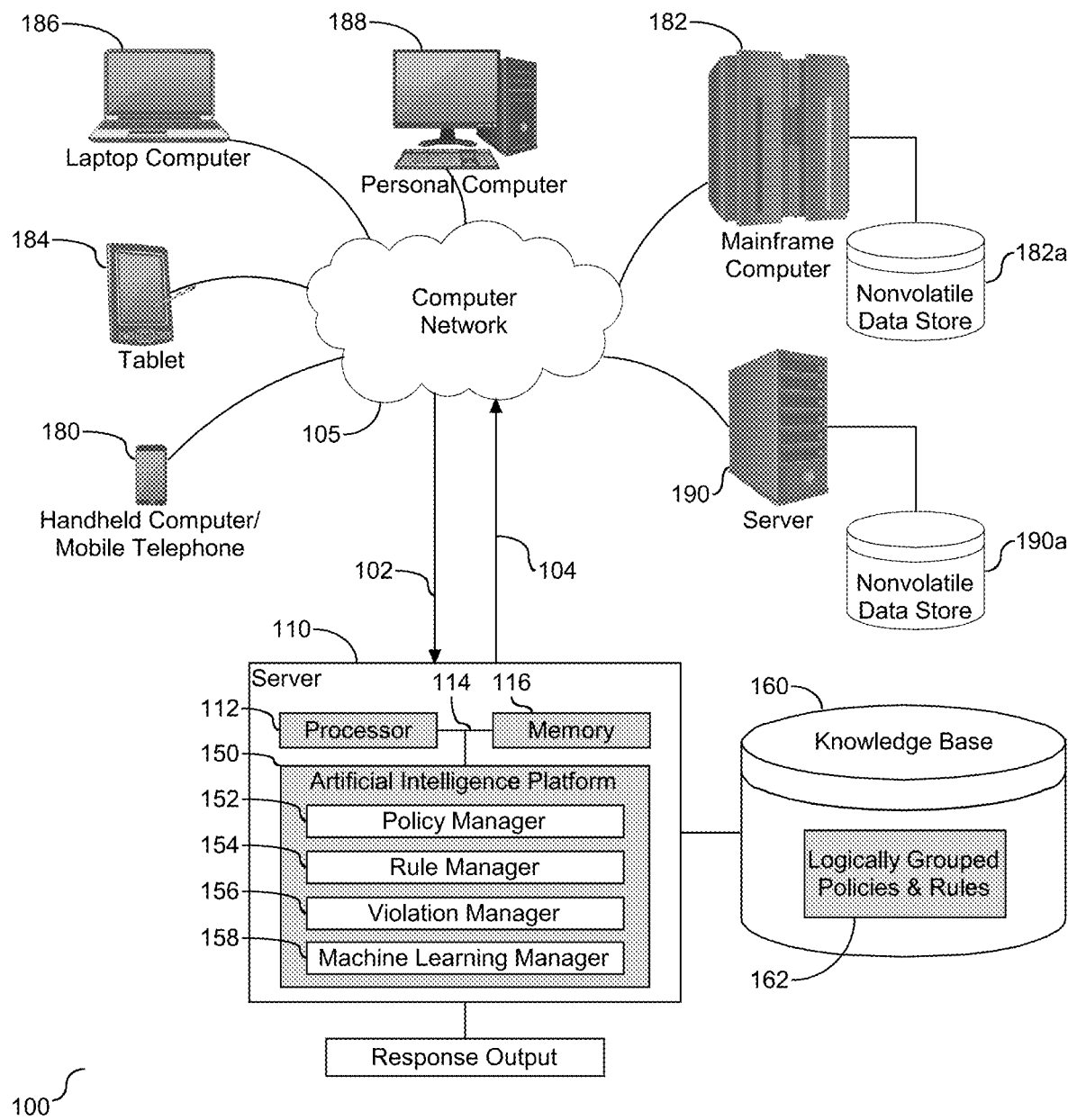
FIG. 1 depicts a system diagram illustrating an artificial intelligence platform computing system.

It will be readily understood that the components of the present embodiments, as generally described and illustrated in the Figures herein, may be arranged and designed in a wide variety of different configurations. Thus, the following details description of the embodiments of the apparatus, system, method, and computer program product of the present embodiments, as presented in the Figures, is not intended to limit the scope of the embodiments, as claimed, but is merely representative of selected embodiments.

Reference throughout this specification to "a select embodiment," "one embodiment," or "an embodiment" means that a particular feature, structure, or characteristic described in connection with the embodiment is included in at least one embodiment. Thus, appearances of the phrases "a select embodiment," "in one embodiment," or "in an embodiment" in various places throughout this specification are not necessarily referring to the same embodiment.

The illustrated embodiments will be best understood by reference to the drawings, wherein like parts are designated by like numerals throughout. The following description is intended only by way of example, and simply illustrates certain selected embodiments of devices, systems, and processes that are consistent with the embodiments as claimed herein.

An intelligent system is provided with tools and algorithms to run intelligent real-time analytics using machine learning to manage a hybrid network infrastructure with pre-defined policies, and intelligently learn policies through learning algorithms. A hybrid network is any computer network that contains two or more different communication standards, e.g. uses more than one type of connecting technology or topology. In one embodiment, the hybrid network ensures different devices can access the same data, which may be stored in different locations. Hybrid networks enable new networking technologies to be introduced, while phasing out older technologies over time. One of the drawbacks of the hybrid network is management and connectivity of devices. Current connectivity solutions are supported statically. Managing security in the hybrid network with respect to device connectivity and network traffic needs to adapt to changing policies and security requirements.

The present embodiments relate to a micro-service computer architecture in the hybrid cloud network. Micro-services or a micro-service architecture refers to a computer environment in which an application is built as a suite of modular components or services based on function definitions, each corresponding to one function definition, and each running in its own process and communicating by a way of lightweight mechanisms. In the micro-service architecture, data is stored outside of the service, and as such the service is stateless. The services or components are commonly referred to as "atomic services." Each atomic service is a lightweight component for independently performing a modular service. For example, an atomic service might receive and combine keywords, process an algorithm, or make a decision based on the result of algorithm processing. Each module supports a specific task and uses a define interface, such as an application programming interface (API) to communicate with other services. The micro-service architecture supports and enables scalability in hybrid network.

Referring to FIG. 1, a schematic diagram of an artificial intelligence platform computing system (100) is depicted. As shown, a server (110) is provided in communication with a plurality of computing devices (180), (182), (184), (186), and (188) across a network connection (105). The server (110) is configured with a processing unit in communication with memory across a bus. The server (110) is shown with an artificial intelligence platform (150) for natural language processing over the network (105) from one or more of the computing devices (180), (182), (184), (186) and (188). More specifically, the computing devices (180), (182), (184), (186), and (188) communicate with each other and with other devices or components via one or more wired and/or wireless data communication links, where each communication link may comprise one or more of wires, routers, switches, transmitters, receivers, or the like. In this networked arrangement, the server (110) and the network connection (105) enable communication detection, recognition, and resolution. Other embodiments of the server (110) may be used with components, systems, sub-systems, and/or devices other than those that are depicted herein.

The artificial intelligence platform (150) is shown herein configured with tools to manage the hybrid network infrastructure, and more specifically, to automate policy evaluation and enforcement. The tools include, but are not limited to, a policy manager (152), a rule manager (154), a violation manager (156), and a machine learning manager (158). The artificial intelligence platform (150) may receive input from the network (105) and leverage a data source (160), also referred to herein as a corpus or knowledge base, to selectively approve a corresponding rule to a network device in the micro-service architecture. As shown, the data source (160) is configured with logically grouped policies and rules (162). In one embodiment, the data source (160) may be configured with other or additional sources of input, and as such, the sources of input shown and described herein should not be considered limiting. Similarly, in one embodiment, the data source (160) includes structured, semi-structured, and/or unstructured content in a plurality of documents that are contained in one or more databases or corpus. The various computing devices (180), (182), (184), (186), and (188) in communication with the network (105) may include access points for logically grouped documents. Some of the computing devices may include devices for a database storing the corpus of data as the body of information used by the artificial intelligence platform (150) to generate response output (170), and to communicate the response output to a corresponding network device in the micro-service architecture operatively coupled to the server (110) or one or more of the computing devices (180)-(188) across network connection (104).

The network (105) may include local network connections and remote connections in various embodiments, such that the artificial intelligence platform (150) may operate in environments of any size, including local and global, e.g. the Internet. Additionally, the artificial intelligence platform (150) serves as a front-end system that can make available a variety of knowledge extracted from or represented in network accessible sources and/or structured data sources. In this manner, some processes populate the artificial intelligence platform (150), with the artificial intelligence platform (150) also including input interfaces to receive requests and respond accordingly.

As shown, rules and corresponding policies are logically grouped (162) for use as part of the corpus (160) of data with the artificial intelligence platform (150). The corpus (160) may include structured and unstructured source of data for use by the artificial intelligence platform (150). The artificial intelligence platform (150), via a network connection or an internet connection to the network (105), is configured to manage network configuration requests, including evaluation of security policies and rules responsive to the request or responsive to network device monitoring. The artificial intelligence platform (150) may effectively determine an output response related to the connection request or monitoring by leveraging the data source (160), which in one embodiment may be operatively coupled to the server (110) across the network (105).

The artificial intelligence platform (150) and the associated tools (152)-(158) leverage the knowledge base (160) to support dynamic rule and policy enforcement and management. The policy manager (152) functions to support a secure connection and policy management for deployed devices. As part of the device connection establishment, the policy manager (152) controls registration of an associated device through connection and policy management and oversight. Specifically, the policy manager (152) defines security policies and encodes such policies as rules, and stores the encoded policies and corresponding rules in the knowledge base (160).

The rule manager (154) is shown herein embedded in the artificial intelligence platform (150). The rule manager (154) functions to conduct an initial analysis of a corresponding network configuration request. As further described below, the rule manager (154) is employed to detect and observe network configuration requests. In one embodiment, the rule manager (154) functions in real-time to detect and observe the network configuration requests. Similarly, in one embodiment, the rule manager (154) functions as a background tool or process for detection and observation and a network configuration request. When a network configuration request is received, the request is accompanied by configuration settings for the associated device, including communication protocols and security settings. It is understood that the device that is the subject of the configuration request may be a physical device, or in one embodiment a virtual device. The rule manager (154) functions to automatically and selectively validate one or more rules corresponding to the settings of the requesting device. Selective validation includes discriminatingly evaluating the requests, which in one embodiment may include approval or denial of the request. An approval may be accompanied with an explanation for acceptance, and similarly a denial may be accompanied by an explanation for a corresponding rejection. At such time as the device configuration request is approved, the rules accompanying the requesting device are automatically submitted to one or more corresponding network devices.

The network infrastructure is dynamic. It is understood that as the infrastructure is subject to change, one or more policies and corresponding rules may be subject to change. A device that has been subject to evaluation and validation during configuration continues to be subject to monitoring following approval. In other words, the policies may change over time based on security requirements, and connectivity is supported dynamically. The violation manager (156) is provided to observe, monitor, and enforce policies over the network infrastructure. For example, the violation manager (156) functions to conduct a risk level assessment of one or more policies, and identify a corresponding risk level violation. The following is an example risk function:

$$R(\theta, \delta) = \mathbb{E}_\theta L(\theta, \delta(X)) = \int_X L(\theta, \delta(X)) dP_\theta(X)$$

where $\theta$ is a fixed (possibly unknown) state of nature, X is a vector of observations stochastically drawn from a population (e.g. communication patterns of S1-S2-S3, criticality of each server, performance observer, impact on the overall application performance), $\delta(X)$ is the expectation overall population values of X; $dP_\theta$ is a probability measure over the event space of X, parametrized by $\theta$; and the integral is evaluated over the entire support of X. The functionality of the violation manager (156) is conducted dynamically. In the event a violation is identified, such as in the corresponding risk function, the rule manager (156) selectively suspends the rules. Accordingly, the active rules are dynamically managed to ensure continued oversight of communication protocols and security settings.

New policies and rules may be learned. As shown, the artificial intelligence platform (150) is provided with a machine learning (ML) manager (158) to enable and support use of ML with respect to policies and policy management, and in one embodiment a corresponding machine learning model (MLM), to encapsulate a corresponding ML algorithm. In one embodiment, the MLM may be utilized to predict network weakness with respect to policies. The MLM functions to dynamically learn and employ new policies as the characteristics of the network, network devices, and security protocols are subject to change. The ML manager (158) discovers and analyzes patterns. In addition, the ML manager (158) may selectively convert one or more of the discovered and analyzed patterns into a new rule, which is stored in the knowledge base (160). As patterns evolve into one or more rules, the violation manager (156) may dynamically recommend the new rule and corresponding policy to one or more of the network devices that have been determined to have risk characteristics. As demonstrated, the rules and corresponding policies are dynamic. The ML manager (158) supports the elasticity of rules and corresponding policies by identifying patterns and encapsulating one or more identified patterns into a corresponding new rule and policy. Accordingly, patterns of security policies are learned over time and used for recommending new rules or validating existing rules.

As new rules and corresponding policies are created, the space for the new rules is identified. The ML manager (158) evaluates whether identified rules belong to existing policies and rules, or assesses space for a new rule or a new class of rules. The following is an example pseudo code for finding new rules space and embedding new rules into the identified rule space.

Inputs: Labeled set $D_1$, unlabled set $D_u$, number of steps T, number of examples per iteration S t=1;
while t<=T do
   Train a multi-label SVM classifier f based on training data
     $D_1$ for each instance x in $D_u$ do
     Predict its label vector $\underline{y}$ using the LR(loss reduction)-based prediction method $$D^*_s = \mathrm{argmax}_{D_s}(\Sigma_{X \in D_s}\Sigma_{i=1}((1-\underline{y}^i f_i(x))/2))$$

constrained to $\underline{y}^i \in \{-1, 1\}$
     (equation for Maximum loss reduction with maximal confidence)
     Calculate the expected loss reduction with the most confident label vector $\underline{y}$, $$\mathrm{score}(x) = \Sigma^k_{i=1}((1-\underline{y}^i f_i(x))/2)$$

Sort score(x) in decreasing order for all x in $D_u$
     Select a set of S examples $D^*_s$ with the largest scores (or experienced SME input), and update the training set $D_1 \leftarrow D_1 + D^*_s$
   end for
   Train the multi-label learner 1 with $D_1$
   t=t+1;
end while In the pseudo code shown herein, $f_i(x)$ is a Support Vector Machine (SVM) algorithm classifier associated with class i, and $x_1 \ldots x_n$ are data points (e.g. feature vector for rules and requests—[name, protocol, port, authentication, confidential information, sensitive_personal_information, encrypted, tunnel, interactive_login, scope]). The SVM is an algorithm to categorize the discovered patterns. The SVM is a discriminative classifier that analyzes data and recognizes patterns which are used for classification. Given a set of training examples, the SVM training algorithm builds a model that assigns new rules into one of the classes, e.g. categories.

The SVM classifier illustrated in the pseudo code utilizes a labeled set $D_1$, which refers to a set of patterns that have been categorized, an unlabeled set, Du, which refers to newly discovered patterns that have not been categorized, and a set of data points $x_1 \ldots x_n$, which represent feature vectors for each instance of information, application type, application group, network monitoring information, etc. The supervised learning algorithm, such as the SVM, can classify a new pattern in unlabeled set $D_1$. When the new pattern is not classified properly, i.e. detected as an outlier, the subject matter expert (SME) can classify the pattern manually and create a new label in the labeled set $D_1$.

As demonstrated in the pseudocode, the ML manager (158) calculates a distance between classes of rules, assesses closeness with respect to existing classes, and finds the largest distance available for a candidate rule from existing classes of rules as potential space for inserting one or more new rules and corresponding policies. Accordingly, the ML manager functions to identify a proper space for incorporating the new rule into the existing space of the knowledge base (160).

The ML manager (158) may further utilize an optimization function to find the best matching pattern for the rules and policies being monitored in place of creating a new rule for the pattern. For example, within a given category of patterns, there may be multiple patterns available for a service, S, in the security policy and rule knowledge base (160). In one embodiment, finding the best matching pattern, P, for the service, S, requires computing the minimum distance between the service S and all available patterns for the service S.

Configuration requests received across the network (105) may be processed by a server (110), for example IBM Watson® server, and the corresponding artificial intelligence (AI) platform (150). As shown herein, the AI platform (150) together with the embedded manager (152) (158) performs an analysis on received requests, as well as dynamically monitors existing rules and policies. The function of the analysis is to establish a secure connection of a network level device. In response to a configuration request and the risk level assessment, a secure connection for a requesting network level device that is in compliance with one or more selectively validated rules may be established. Accordingly, the AI platform (150) evaluates rules and policies for network devices, and selectively establishes secure connections.

In some illustrative embodiments, server (110) may be the IBM Watson® system available from International Business Machines Corporation of Armonk, N.Y., which is augmented with the mechanisms of the illustrative embodiments described hereafter. The IBM Watson® system may receive or detect the network configuration request as input content (102) which it then analyzes to identify characteristics of the corresponding network device and corresponding rules and policies related to the configuration request.

The managers (152)-(158), hereinafter referred to collectively as AI tools, are shown as being embodied in or integrated within the artificial intelligence platform (150) of the server (110). The AI tools may be implemented in a separate computing system (e.g., 190), or in one embodiment a system or systems, can they be implemented in two or more connected across network (105) to the server (110). Wherever embodied, the AI tools function to dynamically monitor violation of security polices and rules, and evaluate network configuration requests with respect to the monitoring security policies and rules, so that a secure communication of the associated request devices may be established.

Types of devices and corresponding systems that can utilize the artificial intelligence platform (150) range from small handheld devices, such as handheld computer/mobile telephone (180) to large mainframe systems, such as mainframe computer (182). Examples of handheld computer (180) include personal digital assistants (PDAs), personal entertainment devices, such as MP4 players, portable televisions, and compact disc players. Other examples of information handling systems include pen, or tablet computer (184), laptop, or notebook computer (186), personal computer system (188), and server (190). As shown, the various devices and systems can be networked together using computer network (105). Types of computer network (105) that can be used to interconnect the various devices and systems include Local Area Networks (LANs), Wireless Local Area Networks (WLANs), the Internet, the Public Switched Telephone Network (PSTN), other wireless networks, and any other network topology that can be used to interconnect the devices and systems. Many of the devices and systems include nonvolatile data stores, such as hard drives and/or nonvolatile memory. Some of the devices and systems may use separate nonvolatile data stores (e.g., server (190) utilizes nonvolatile data store (190a), and mainframe computer (182) utilizes nonvolatile data store (182a). The nonvolatile data store (182a) can be a component that is external to the various devices and systems or can be internal to one of the devices and systems.

The device(s) and system(s) employed to support the artificial intelligence platform (150) may take many forms, some of which are shown in FIG. 1. For example, an information handling system may take the form of a desktop, server, portable, laptop, notebook, or other form factor computer or data processing system. In addition, the device(s) and system(s) may take other form factors such as a personal digital assistant (PDA), a gaming device, ATM machine, a portable telephone device, a communication device or other devices that include a processor and memory.

Figure 2:
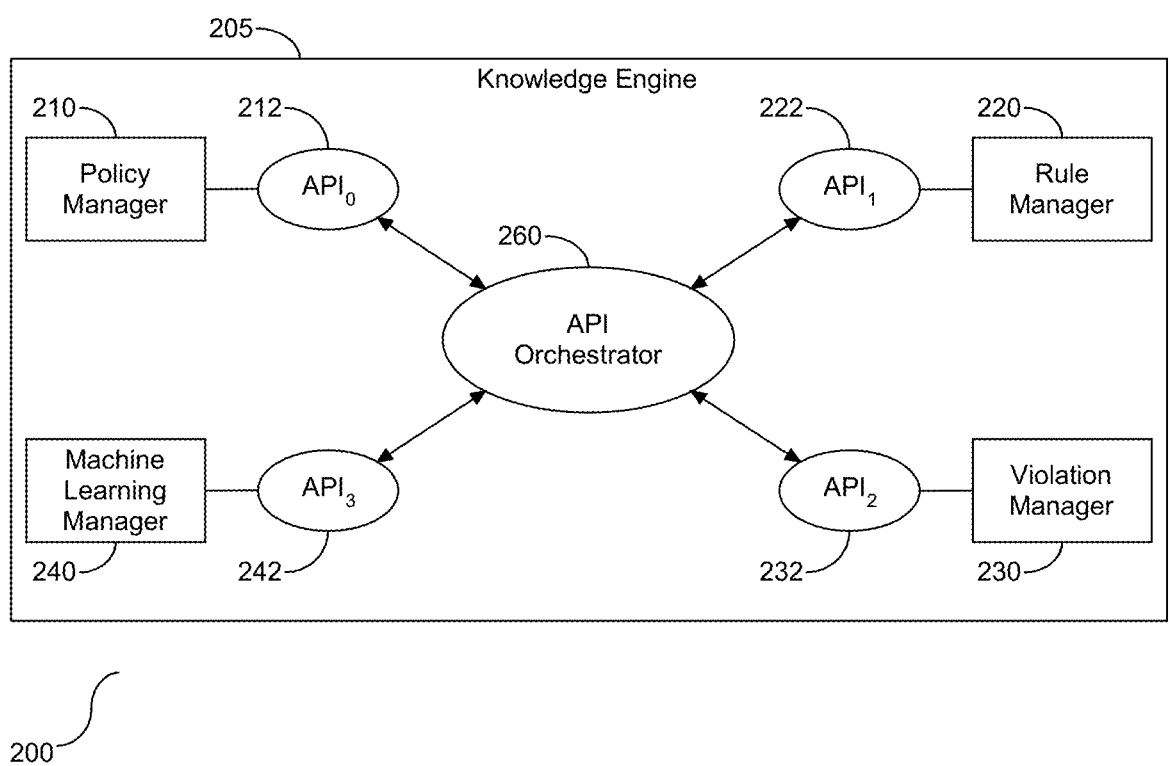
FIG. 2 depicts a block diagram illustrating the artificial intelligence platform tools, as shown and described in FIG. 1, and their associated application program interfaces.

An Application Program Interface (API) is understood in the art as a software intermediary between two or more applications. With respect to the artificial intelligence platform (150) shown and described in FIG. 1, one or more APIs may be utilized to support one or more of the tools (152)-(158) and their associated functionality. Referring to FIG. 2, a block diagram (200) is provided illustrating the tools (152)-(158) and their associated APIs. As shown, a plurality of tools is embedded within the knowledge engine (205), with the tools including the policy manager (152) shown herein as (210) associated with $API_0$ (212), the rule manager (154) shown herein as (220) associated with $API_1$ (222), the violation manager (156) shown herein as (230) associated with $API_2$ (232), and the ML manager (158) shown herein as (240) associated with $API_3$ (242). Each of the APIs may be implemented in one or more languages and interface specifications. $API_0$ (212) provides functional support to define and encode security policies as one or more rules; $API_1$ (222) provides functional support to selectively submit one or more approved rules to a corresponding network device, and in one embodiment selectively suspend one or more rules that violate an associated security policy; API$_2$ (232) provides functional support to assess risk level and rule violation in the micro-service architecture; and API$_3$ (242) provides functional support to dynamically learn and discover patterns, and selectively consolidate patterns into rules. As shown, each of the APIs (212), (222), (232), and (242) are operatively coupled to an API orchestrator (260), otherwise known as an orchestration layer, which is understood in the art to function as an abstraction layer to transparently thread together the separate APIs. In one embodiment, the functionality of the separate APIs may be joined or combined. As such, the configuration of the APIs shown herein should not be considered limiting. Accordingly, as shown herein, the functionality of the tools may be embodied or supported by their respective APIs.

Figure 3:
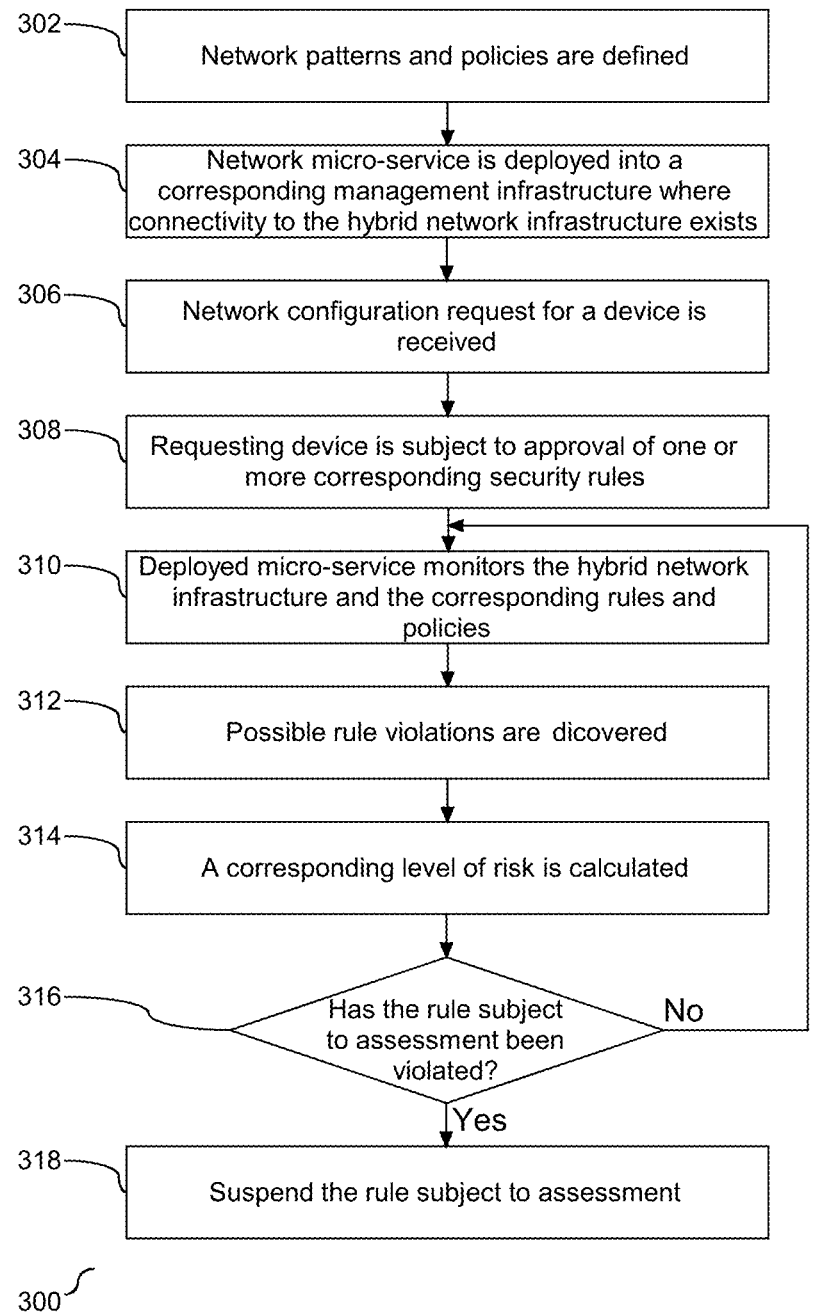
FIG. 3 depicts a flow chart illustrating a process for automated monitoring of connectivity to the hybrid network infrastructure.

Referring to FIG. 3, a flow chart (300) is provided illustrating a process for automated monitoring of connectivity to the hybrid network infrastructure. As shown, network patterns and policies are defined (302). In one embodiment, the patterns and policies are defined by one or more network and security administrators. A network micro-service is deployed into a corresponding management infrastructure where connectivity to the hybrid network infrastructure exists (304). The deployed micro-service is a stateless application. The deployed micro-service is accessed to insert traffic patterns and register network devices, including physical and virtual devices. Devices, whether virtual or physical, are registered in the micro-service architecture and composed as a topology graph. In one embodiment, the topology of the devices is auxiliary information used to determine or facilitate connectivity of devices. As shown herein, as a network configuration request for a device (either physical or virtual) is received (306), the requesting device is subject to approval of one or more corresponding security rules (308). The micro-service enforces rules and corresponding policies to the hybrid network infrastructure.

The deployed micro-service monitors the hybrid network infrastructure and the corresponding rules and policies (310). As possible rule violations are discovered (312) a corresponding level of risk is calculated (314). In one embodiment, the calculation at step (314) includes a comparison of the rule subject to assessment with associated rule characteristics. It is determined if the rule subject to assessment has been violated (316), e.g. has the level of risk been exceeded. A negative response to the determination is followed by a return to step (310) for continued monitoring. However, a positive response to the determination at step (316) is followed by a suspension of the rule subject to assessment (318). Accordingly, as shown herein, network connectivity is monitored for rule violation assessment, and selective rule suspension.

Figure 4:
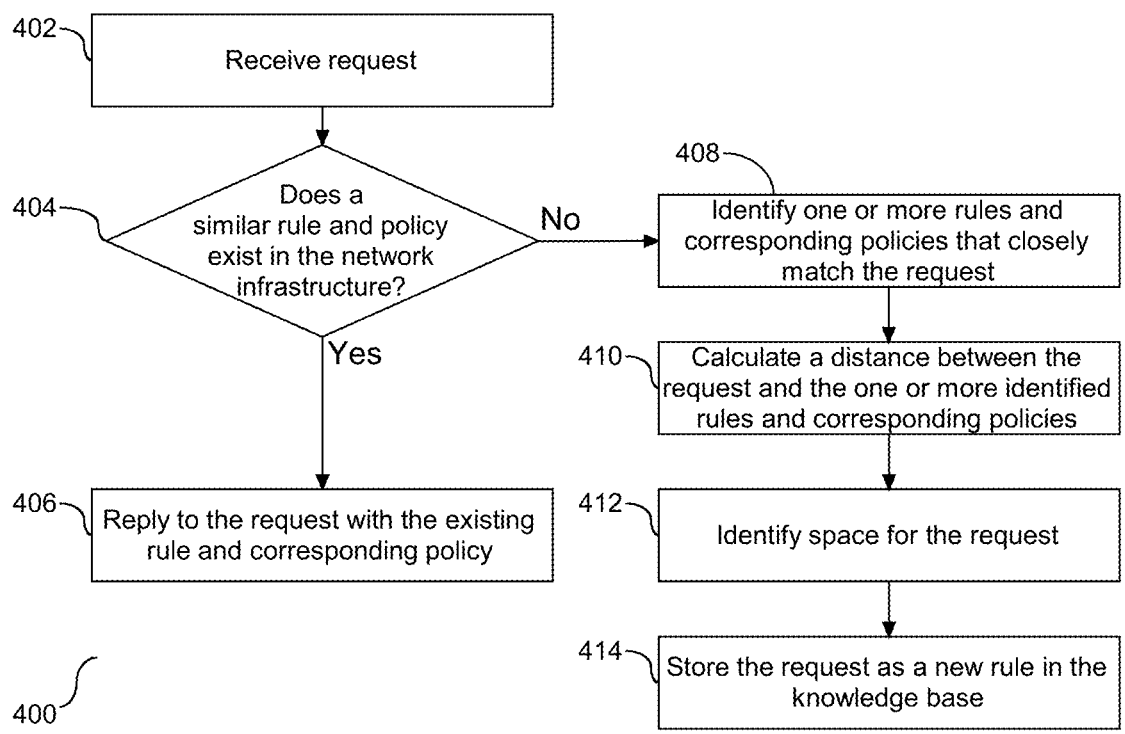
FIG. 4 depicts a flow chart illustrating a process for reviewing submitted rules and policies for approval.

It is understood that rules and corresponding policies may be learned and selectively applied to the hybrid network infrastructure. Similarly, in one embodiment a new rule and corresponding policy may be submitted to the network infrastructure for approval. Referring to FIG. 4, a flow chart (400) is provided illustrating a process for reviewing submitted rules and policies for approval. As shown, a corresponding request is received (402), and the received request is assessed with respect to existing policies and rules (404). More specifically, it is determined if a similar rule and corresponding policy exist in the network infrastructure. A positive response to the determination at step (404) is followed by replying to the request with the existing rule and corresponding policy (406). However, a negative response to the determination at step (404) is followed by identifying one or more rules and corresponding policies that closely match the request (408) and calculating a distance between the request and the one or more identified rules and corresponding policies (410). As shown and described in FIG. 1, the distance calculation utilizes the ML manager (158). Based on the distance calculation, space for the request is identified (412) and the request is stored as a new rule in the knowledge base (414). Accordingly, new rules and corresponding policies may be submitted to the network infrastructure.

Figure 5:
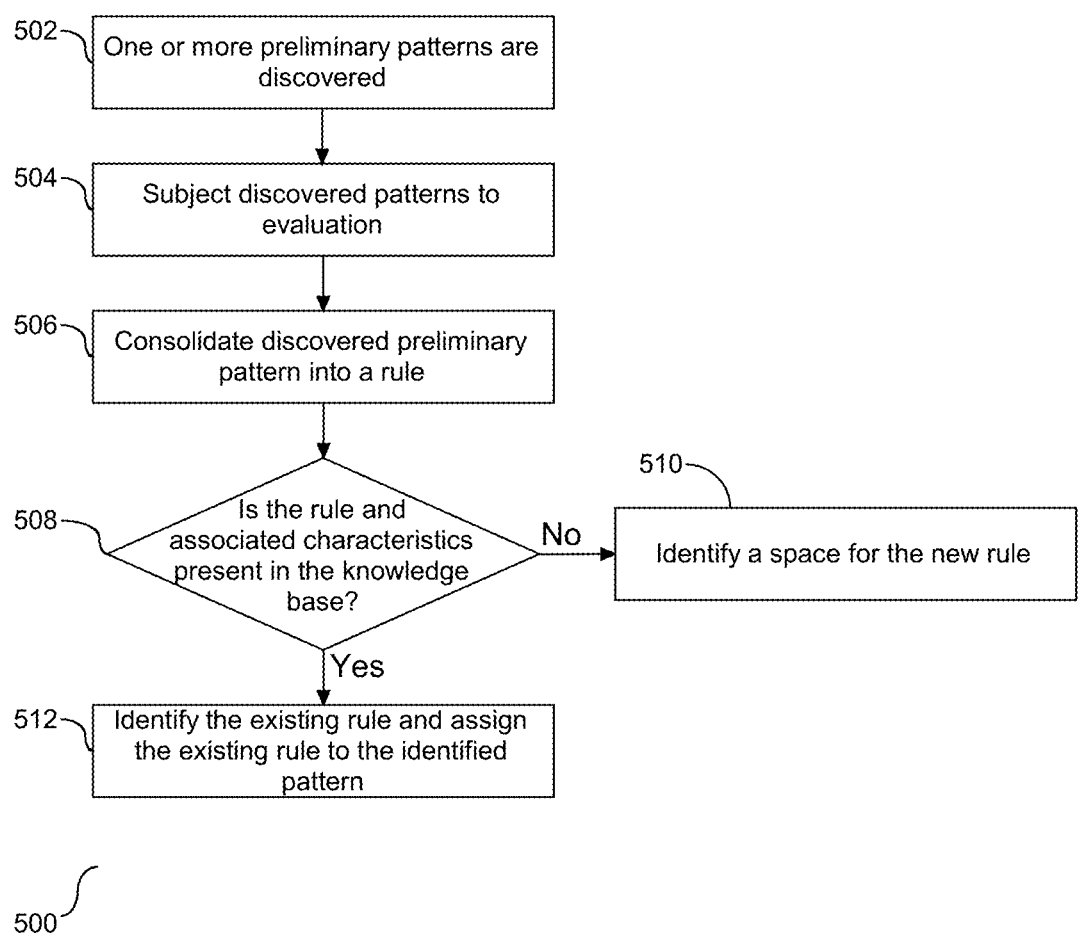
FIG. 5 depicts a flow chart illustrating a process for dynamically creating a new rule.

It is understood that new rules and corresponding policies may be learned, and do not have to be explicitly submitted. Referring to FIG. 5, a flow chart (500) is provided to illustrate a process for dynamically creating a new rule. As shown, one or more preliminary patterns are discovered (502) and subject to evaluation (504). The preliminary patterns are initial patterns discovered from the learning, and they will be persistent patterns once evaluation or verification is completed. In one embodiment, a learning algorithm is utilized to intelligently identify the preliminary pattern. The discovered preliminary pattern is consolidated into a rule (506), and it is determined if the rule and associated characteristics is present in the knowledge base (508), e.g. does the rule exist. A negative response to the determination at step (508) is followed by identifying a space for the new rule (510), as shown and described in FIG. 4. Similarly, a positive response to the determination at step (508) is followed by identifying the existing rule and assigning the existing rule to the identified pattern (512). Accordingly, the learning algorithm is demonstrated herein to identify and evaluate preliminary patterns, and selectively convert the patterns to an existing rule or a new rule.

The processes shown and described in FIGS. 3-5 are directed at a network management micro-service engine to automate policy checking and enforcement. There are different use cases for the engine. For example, in one use case, the micro-service engine may be embodied into a cloud account to manage the hybrid network infrastructure with policies. Similarly, in another use case, the micro-service engine may be embodied as a compliance checker to ensure that policies are maintained in the hybrid network infrastructure.

Embodiments shown and described herein may be in the form of a computer system for use with an intelligent computer platform for providing automated hybrid network infrastructure management. Aspects of the manager (152)-(158) and their associated functionality may be embodied in a computer system/server in a single location, or in one embodiment, may be configured in a cloud based system sharing computing resources. With references to FIG. 6, a block diagram (600) is provided illustrating an example of a computer system/server (602), hereinafter referred to as a host (602) in communication with a cloud based support system, to implement the processes described above with respect to FIGS. 3-5. Host (602) is operational with numerous other general purpose or special purpose computing system environments or configurations. Examples of well-known computing systems, environments, and/or configurations that may be suitable for use with host (602) include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and file systems (e.g., distributed storage environments and distributed cloud computing environments) that include any of the above systems, devices, and their equivalents.

Host (602) may be described in the general context of computer system-executable instructions, such as program modules, being executed by a computer system. Generally, program modules may include routines, programs, objects, components, logic, data structures, and so on that perform particular tasks or implement particular abstract data types. Host (602) may be practiced in distributed cloud computing environments where tasks are performed by remote processing devices that are linked through a communications network. In a distributed cloud computing environment, program modules may be located in both local and remote computer system storage media including memory storage devices.

Figure 6:
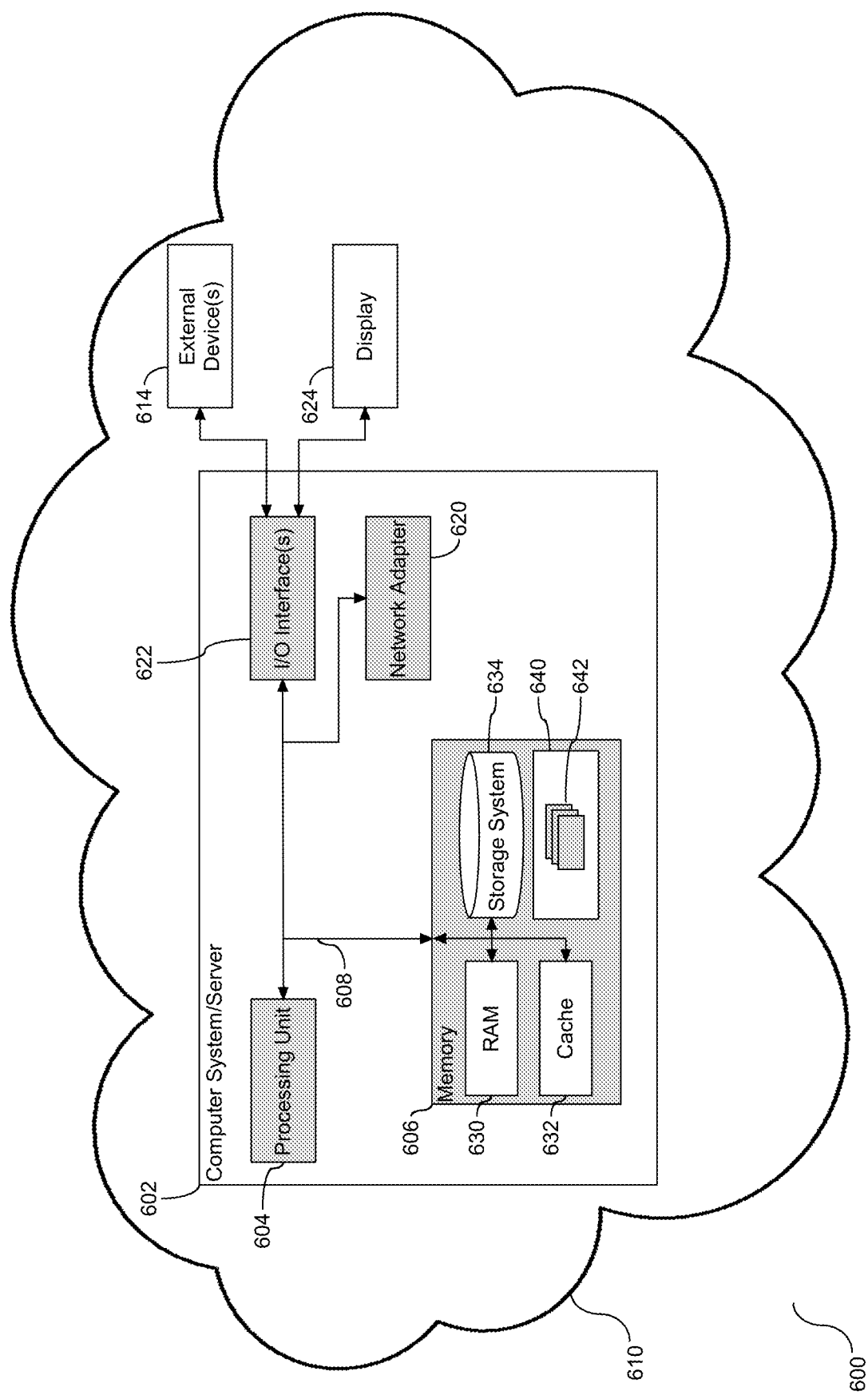
FIG. 6 depicts a block diagram illustrating an example of a computer system/server of a cloud based support system, to implement the system and processes described above with respect to FIGS. 1-5.

As shown in FIG. 6, host (602) is shown in the form of a general-purpose computing device. The components of host (602) may include, but are not limited to, one or more processors or processing units (604), e.g. hardware processors, a system memory (606), and a bus (608) that couples various system components including system memory (606) to processor (604). Bus (608) represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Host (602) typically includes a variety of computer system readable media. Such media may be any available media that is accessible by host (602) and it includes both volatile and non-volatile media, removable and non-removable media.

Memory (606) can include computer system readable media in the form of volatile memory, such as random access memory (RAM) (630) and/or cache memory (632). By way of example only, storage system (634) can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus (608) by one or more data media interfaces.

Program/utility (640), having a set (at least one) of program modules (642), may be stored in memory (606) by way of example, and not limitation, as well as an operating system, one or more application programs, other program modules, and program data. Each of the operating systems, one or more application programs, other program modules, and program data or some combination thereof, may include an implementation of a networking environment. Program modules (642) generally carry out the functions and/or methodologies of embodiments to dynamically communicate evaluation interrogatory identification and processing. For example, the set of program modules (642) may include the tools (152)-(158) as described in FIG. 1.

Host (602) may also communicate with one or more external devices (614), such as a keyboard, a pointing device, etc.; a display (624); one or more devices that enable a user to interact with host (602); and/or any devices (e.g., network card, modem, etc.) that enable host (602) to communicate with one or more other computing devices. Such communication can occur via Input/Output (I/O) interface(s) (622). Still yet, host (602) can communicate with one or more networks such as a local area network (LAN), a general wide area network (WAN), and/or a public network (e.g., the Internet) via network adapter (620). As depicted, network adapter (620) communicates with the other components of host (602) via bus (608). In one embodiment, a plurality of nodes of a distributed file system (not shown) is in communication with the host (602) via the I/O interface (622) or via the network adapter (620). It should be understood that although not shown, other hardware and/or software components could be used in conjunction with host (602). Examples, include, but are not limited to: microcode, device drivers, redundant processing units, external disk drive arrays, RAID systems, tape drives, and data archival storage systems, etc.

In this document, the terms "computer program medium," "computer usable medium," and "computer readable medium" are used to generally refer to media such as main memory (606), including RAM (630), cache (632), and storage system (634), such as a removable storage drive and a hard disk installed in a hard disk drive.

Computer programs (also called computer control logic) are stored in memory (606). Computer programs may also be received via a communication interface, such as network adapter (620). Such computer programs, when run, enable the computer system to perform the features of the present embodiments as discussed herein. In particular, the computer programs, when run, enable the processing unit (604) to perform the features of the computer system. Accordingly, such computer programs represent controllers of the computer system.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a dynamic or static random access memory (RAM), a read-only memory (ROM), an erasable programmable read-only memory (EPROM or Flash memory), a magnetic storage device, a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server or cluster of servers. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the embodiments.

In one embodiment, host (602) is a node of a cloud computing environment. As is known in the art, cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models. Example of such characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher layer of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some layer of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 7:
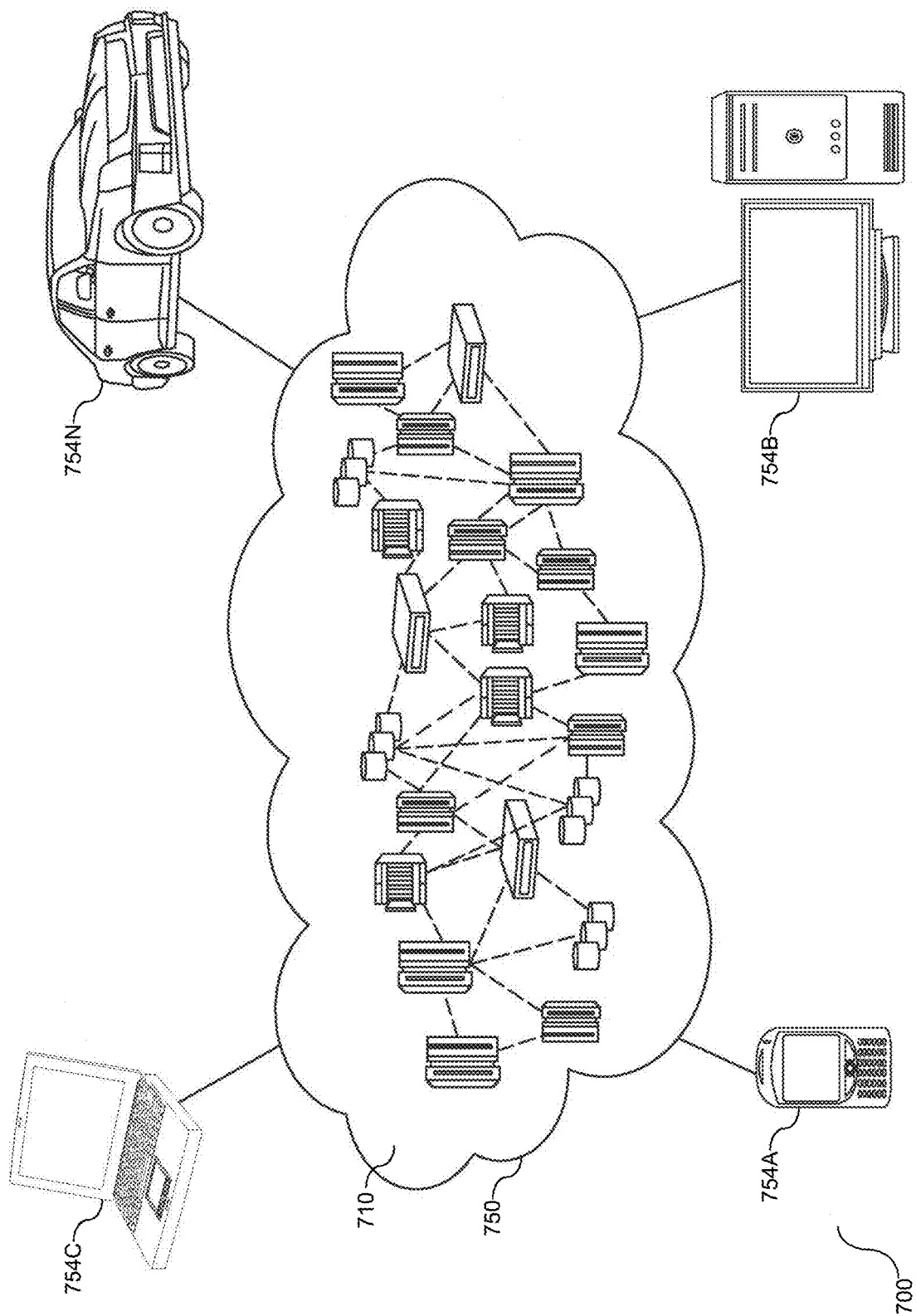
FIG. 7 depicts a block diagram illustrating a cloud computer environment.

Referring now to FIG. 7, an illustrative cloud computing network (700). As shown, cloud computing network (700) includes a cloud computing environment (750) having one or more cloud computing nodes (710) with which local computing devices used by cloud consumers may communicate. Examples of these local computing devices include, but are not limited to, personal digital assistant (PDA) or cellular telephone (754A), desktop computer (754B), laptop computer (754C), and/or automobile computer system (754N). Individual nodes within nodes (710) may further communicate with one another. They may be grouped (not shown) physically or virtually, in one or more networks, such as Private, Community, Public, or Hybrid clouds as described hereinabove, or a combination thereof. This allows cloud computing environment (700) to offer infrastructure, platforms and/or software as services for which a cloud consumer does not need to maintain resources on a local computing device. It is understood that the types of computing devices (754A-N) shown in FIG. 7 are intended to be illustrative only and that the cloud computing environment (750) can communicate with any type of computerized device over any type of network and/or network addressable connection (e.g., using a web browser).

Figure 8:
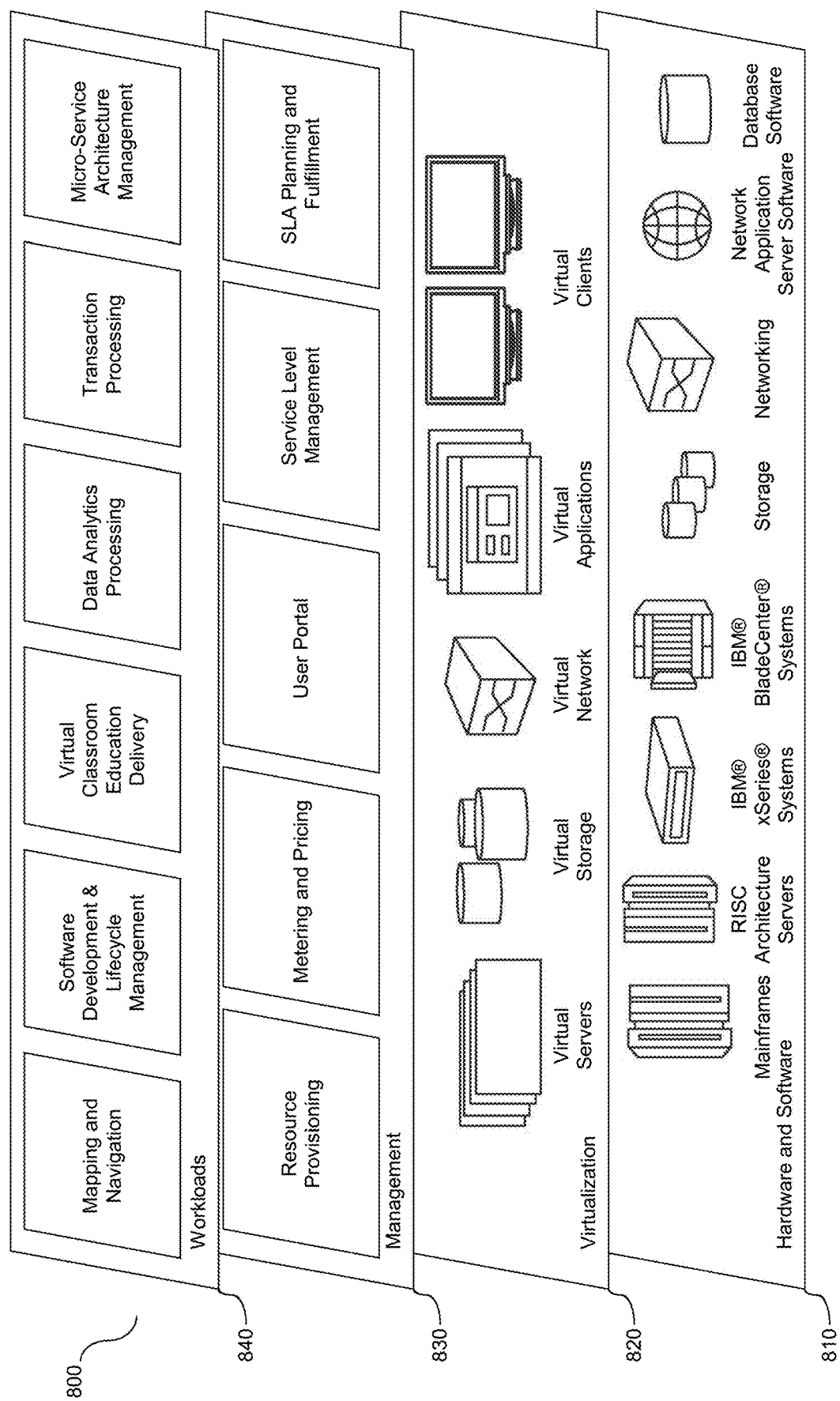
FIG. 8 depicts a block diagram illustrating a set of functional abstraction model layers provided by the cloud computing environment.

Referring now to FIG. 8, a set of functional abstraction layers (800) provided by the cloud computing network of FIG. 7 is shown. It should be understood in advance that the components, layers, and functions shown in FIG. 8 are intended to be illustrative only, and the embodiments are not limited thereto. As depicted, the following layers and corresponding functions are provided: hardware and software layer (810), virtualization layer (820), management layer (830), and workload layer (840).

The hardware and software layer (810) includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer (820) provides an abstraction layer from which the following examples of virtual entities may be provided: virtual servers; virtual storage; virtual networks, including virtual private networks; virtual applications and operating systems; and virtual clients.

In one example, management layer (830) may provide the following functions: resource provisioning, metering and pricing, user portal, service layer management, and SLA planning and fulfillment. Resource provisioning provides dynamic procurement of computing resources and other resources that are utilized to perform tasks within the cloud computing environment. Metering and pricing provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service layer management provides cloud computing resource allocation and management such that required service layers are met. Service Layer Agreement (SLA) planning and fulfillment provides pre-arrangement for, and procurement of, cloud computing resources for which a future requirement is anticipated in accordance with an SLA.

Workloads layer (840) provides examples of functionality for which the cloud computing environment may be utilized. Examples of workloads and functions which may be provided from this layer include, but are not limited to: mapping and navigation; software development and lifecycle management; virtual classroom education delivery; data analytics processing; transaction processing; and micro-service architecture connection and policy management.

It will be appreciated that there is disclosed herein a system, method, apparatus, and computer program product for evaluating natural language input, detecting an interrogatory in a corresponding communication, and resolving the detected interrogatory with an answer and/or supporting content.

While particular embodiments of the present embodiments have been shown and described, it will be obvious to those skilled in the art that, based upon the teachings herein, changes and modifications may be made without departing from the embodiments and its broader aspects. Therefore, the appended claims are to encompass within their scope all such changes and modifications as are within the true spirit and scope of the embodiments. Furthermore, it is to be understood that the embodiments are solely defined by the appended claims. It will be understood by those with skill in the art that if a specific number of an introduced claim element is intended, such intent will be explicitly recited in the claim, and in the absence of such recitation no such limitation is present. For a non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to embodiments containing only one such element, even when the same claim includes the introductory phrases "one or more" or "at least one" and indefinite articles such as "a" or "an"; the same holds true for the use in the claims of definite articles.

The present embodiments may be a system, a method, and/or a computer program product. In addition, selected aspects of the present embodiments may take the form of an entirely hardware embodiment, an entirely software embodiment (including firmware, resident software, micro-code, etc.) or an embodiment combining software and/or hardware aspects that may all generally be referred to herein as a "circuit," "module" or "system." Furthermore, aspects of the present embodiments may take the form of computer program product embodied in a computer readable storage medium (or media) having computer readable program instructions thereon for causing a processor to carry out aspects of the present embodiments. Thus embodied, the disclosed system, a method, and/or a computer program product is operative to improve the functionality and operation of an artificial intelligence platform to resolve interrogatories with intent identification and a corresponding response related to the identified intent.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a dynamic or static random access memory (RAM), a read-only memory (ROM), an erasable programmable read-only memory (EPROM or Flash memory), a magnetic storage device, a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server or cluster of servers. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present embodiments.

Aspects of the present embodiments are described herein with reference to flowchart illustrations and/or block diagrams of methods, apparatus (systems), and computer program products according to embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be appreciated that, although specific embodiments have been described herein for purposes of illustration, various modifications may be made without departing from the spirit and scope of the embodiments. Accordingly, the scope of protection of the embodiments is limited only by the following claims and their equivalents.

What is claimed is:

1. A computer system comprising:
a processing unit operatively coupled to memory;
an artificial intelligence platform in communication with the processing unit, the platform to deploy a micro-service architecture as a stateless application to manage a hybrid network infrastructure, the micro-service architecture supporting secure connection and policy management for devices deployed at a network level, including;
a policy manager configured to register one or more devices via the micro-service architecture;
the policy manager configured to define one or more security policies, and encode the defined one or more security policies as one or more rules;

responsive to a network configuration request, a rule manager configured to selectively validate the one or more rules corresponding to a setting of the request;

a machine learning manager configured to leverage a machine learning model configured to discover and analyze one or more patterns of the one or more validated rules and selectively convert at least one of the analyzed patterns into a new rule; and a secure connection established for the one or more registered devices in compliance with the new rule.

2. The system of claim 1, further comprising a violation manager to dynamically monitor violation of the selectively validated one or more rules across one or more network devices in the micro-service architecture, including assess a risk level and a corresponding rule violation.

3. The system of claim 2, wherein the violation manager dynamically monitors violation of the selectively validated one or more rules, and further comprising the violation manager to selectively suspend one or more rules subject to the assessed risk level and the corresponding rule violation.

4. The system of claim 2, further comprising responsive to the assessed risk level and the corresponding rule violation, the violation manager configured to determine a device security policy, wherein the determined device security policy comprises the new rule, the selectively validated one or more rules, or a combination thereof.

5. The system of claim 1, further comprising the violation manager to recommend the new rule to one or more of the network devices in the micro-service architecture.

6. The system of claim 1, further comprising the machine learning manager to calculate a distance between classes of existing rules, identify a class responsive to the calculated distance, deploy the identified class as a class rule in the micro-service architecture, and store the class rule in a knowledge base operatively coupled to the micro-service architecture.

7. The system of claim 1, further comprising the machine learning manager configured to identify space for incorporating the new rule, wherein the identification of the space is determined by calculating a distance between classes of existing rules, assessing closeness with respect to the classes of existing rules, and identify a largest distance available for the new rule from the classes of existing rules.

8. The system of claim 7, further comprising the machine learning manager to utilize an optimization function to identify a best matching pattern, wherein the identification of the best matching pattern is based on a minimum distance between a service and the discovered one or more patterns.

9. A computer program product to deploy a micro-service architecture as a stateless application, the micro-service supporting secure connection and policy management for devices deployed at a network level, the computer program product comprising a computer readable storage medium coupled to memory having program code embodied therewith, the program code executable by a processor to:

register one or more devices via the micro-service architecture;

define one or more security policies, and encode the defined one or more security policies as one or more rules;

responsive to a network configuration request, selectively validate the one or more rules corresponding to a setting of the request;

leverage a machine learning model to discover and analyze one or more patterns of the one or more validated rules and selectively convert at least one of the analyzed patterns into a new rule; and a secure connection established for the one or more registered devices in compliance with the new rule.

10. The computer program product of claim 9, further comprising program code to dynamically monitor violation of the selectively validated one or more rules across one or more network devices in the micro-service architecture, including assess a risk level and a corresponding rule violation.

11. The computer program product of claim 10, wherein the program code to dynamically monitor rule violation in the micro-service architecture further comprises including program code to selectively suspend one or more rules subject to the assessed risk level and the corresponding rule violation.

12. The computer program product of claim 9, further comprising program code to recommend the new rule to one or more of the network devices in the micro-service architecture.

13. The computer program product of claim 12, wherein the network device is selected from the group consisting of: a physical device and a virtual device.

14. The computer program product of claim 9, further comprising program code to calculate a distance between classes of existing rules, identify a class responsive to the calculated distance, deploy the identified class as a class rule in the micro-service architecture, and store the class rule in a knowledge base operatively coupled to the micro-service architecture.

15. A method comprising:

deploying a micro-service architecture as a stateless application, the micro-service supporting secure connection and policy management for devices deployed at a network level, including;

registering one or more devices via the micro-service architecture;

defining one or more security policies, and encoding the defined one or more security policies as one or more rules;

responsive to a network configuration request, selectively validating the one or more rules corresponding to a setting of the request;

leveraging a machine learning model to discover and analyze one or more patterns of the one or more validated rules and selectively converting at least of the analyzed patterns into a new rule; and a secure connection established for the one or more registered devices in compliance with the new rule.

16. The method of claim 15, further comprising dynamically monitoring violation of the selectively validated one or more rules across one or more network devices in the micro-service architecture, including assessing a risk level and a corresponding rule violation.

17. The method of claim 16, wherein the dynamic monitoring violation of the selectively validated one or more rules further comprises selectively suspending one or more rules subject to the assessed risk level and the corresponding rule violation.

18. The method of claim 15, further comprising recommending the new rule to one or more of the network devices in the micro-service architecture.

19. The method of claim 18, wherein the network device is selected from the group consisting of: a physical device and a virtual device.

20. The method of claim 15, further comprising calculating a distance between classes of existing rules, identifying a class responsive to the calculated distance, deploying the identified class as a class rule in the micro-service architecture, and storing the class rule in a knowledge base operatively coupled to the micro-service architecture.

\* \* \* \* \*